US005867775A

United States Patent [19]

Shirai et al.

[11] Patent Number: 5,867,775

[45] Date of Patent: Feb. 2, 1999

[54] FAIL-SAFE SIGNAL TRANSMITTING APPARATUS PRODUCING A LOGICAL PRODUCT OF AN INPUT SIGNAL AND A CARRIER SIGNAL

[75] Inventors: Toshihito Shirai, Urawa; Hiroji Anzai, Utsunomiya; Koichi Futsuhara, Urawa, all of Japan

[73] Assignee: The Nippon Signal Co., Ltd., Tokyo, Japan

[21] Appl. No.: 666,469

[22] PCT Filed: Oct. 28, 1994

[86] PCT No.: PCT/JP94/01825

§ 371 Date: Jun. 28, 1996

§ 102(e) Date: Jun. 28, 1996

[87] PCT Pub. No.: WO96/13818

PCT Pub. Date: May 9, 1996

[51] Int. Cl.$^6$ .......... H04B 1/04

[52] U.S. Cl. .......... 455/115; 455/117; 340/636

[58] Field of Search .......... 455/8, 9, 91, 115, 455/117, 127, 67.1, 7; 323/274; 361/88, 89, 90, 93, 94, 98, 18; 340/636, 660, 661, 662, 663, 664

[56] References Cited

U.S. PATENT DOCUMENTS

| | | | |
|---|---|---|---|
| 4,035,727 | 7/1977 | Ishii | 455/115 X |
| 4,661,880 | 4/1987 | Futsuhara | 361/93 |
| 5,027,114 | 6/1991 | Kawashima et al. | 340/941 |
| 5,345,138 | 9/1994 | Mukaidono et al. | 307/326 |
| 5,526,528 | 6/1996 | Kurisu | 455/127 X |
| 5,666,081 | 9/1997 | Sakai et al. | 361/89 X |
| 5,666,646 | 9/1997 | McCollum et al. | 455/9 X |

FOREIGN PATENT DOCUMENTS

| | | |
|---|---|---|
| 1-23006 | 4/1989 | Japan . |

*Primary Examiner*—Wellington Chin
*Assistant Examiner*—Philip J. Sobutka
*Attorney, Agent, or Firm*—Oblon, Spivak, McClelland, Maier & Neustadt, P.C.

[57] ABSTRACT

A fail-safe signal transmitting apparatus including a power supply which does not let a transmission output signal generate an error that would allow a dangerous situation to arise even when a multiple failure has occurred in circuits constituting the signal transmitting apparatus. In particular, the present invention includes a source failure monitoring function and in order to monitor the power supply, a fail-safe window comparator and a fail-safe ON delay circuit are employed. An output signal constituted of the logical product of source monitoring signal and a signal to be transmitted and a carrier signal is used as a transmission signal.

8 Claims, 7 Drawing Sheets

FAIL-SAFE SIGNAL TRANSMITTING APPARATUS PRODUCING A LOGICAL PRODUCT OF AN INPUT SIGNAL AND A CARRIER SIGNAL

BACKGROUND OF THE INVENTION

1. Field of the Invention

The present invention relates to a fail-safe signal transmitting apparatus and a constant voltage power supply. More specifically, the present invention relates to a fail-safe signal transmitting apparatus which ensures that no error is generated in the output transmission signal which would allow a dangerous situation to arise, even when a multiple failure has occurred in circuits that include the power supply and that constitute a signal transmitting apparatus.

2. Discussion of the Background

In areas such as railway technology, press control, aircraft control technology and nuclear power technology which require a high degree of safety, a completely fail-safe signal transmitting apparatus, which operates in support of its safety function without error in the case of a circuit failure is absolutely necessary. Fail-safe signal processing technology is disclosed in publications such as, U.S. Pat. No. 4,661,880, U.S. Pat. No. 5,027,114, U.S. Pat. No. 5,345,138, Japanese Examined Patent Publication No. 23006/1989 and Japanese Examined Patent Publication No. 2948/1993. By adopting the technology disclosed in these publications of prior art, signal transmission can be fail-safe under limited conditions. However, these publications of prior art do not disclose a means for securing fail-safe transmission in case of a circuit failure in the signal transmitting apparatus accompanied by a failure in a constant voltage power supply that delivers power to the signal transmitting apparatus.

Normally, a commercially available constant voltage power supply is provided with an excess current detector and a protection circuit that shuts down the output current if an excess current should be supplied to the load. Such a constant voltage power supply is provided with a constant voltage circuit which may be a so-called series regulator. However, in a constant voltage power supply provided with an excess current protection circuit, there is no provision for a failure mode that will disable the function for cutting off excess current when there is a failure in the excess current detection circuit. A fail-safe source monitoring apparatus, which cuts off the output current from the constant voltage power supply or the output from the processing apparatus that uses the output of the source voltage when a failure occurs in the excess current protecting apparatus, does not exist in the prior art. In addition, a fail-safe source monitoring apparatus that cuts off the output if there is a failure in the constant voltage power supply does not exist in the prior art.

This means that even when the signal transmitting apparatus itself has a fail-safe circuit structure, the fail-safe aspect of the entire signal transmitting apparatus including the power supply is lost in case of a circuit failure in the power supply.

SUMMARY OF THE INVENTION

It is an object of the present invention to provide a fail-safe signal transmitting apparatus that can only generate a transmission output signal when the power supply is operating normally and, as a result, is fail-safe against failures in the power supply.

It is a further object of the present invention to provide a signal transmitting apparatus provided with a fail-safe source monitoring function to cut off the output when a failure occurs in the power supply.

In order to achieve the objects described above, the fail-safe signal transmitting apparatus according to the present invention uses a transmission signal and a source monitoring signal as input signals and transmits output signals that correspond to the transmission signals mentioned above. The fail-safe signal transmitting apparatus according to the present invention transmits an output signal constituted of the logical product of two signals, one being a signal that indicates that the transmission signal and the source monitoring signal are normal, and another being a carrier signal which is used for carrying the transmission signal. The output signal is not generated when there is a failure.

When there is no circuit failure in the signal transmitting apparatus and a signal indicating that the transmission signal and the source monitoring signal are normal is input, the logical product of this signal and the carrier signal for carrying the transmission signal is taken and the transmission signal is carried by the carrier signal.

When there is no failure in the signal transmitting apparatus, but a circuit failure has occurred in the power supply, the signal to indicate that the source monitoring signal is normal is not generated. As a result, the logical product for carrying the transmission signal is not established and the output signal is not generated. Also, in the signal transmitting apparatus, an output signal is not generated at the time of a failure. In summary, the signal transmitting apparatus according to the present invention can generate an output signal on the transmission side only when the power supply is operating normally.

Preferably, the signal transmitting apparatus according to the present invention should include a logical product computing circuit and a switch circuit. The logical product computing circuit performs logical product calculation of the source monitoring signal and the transmission signal and does not generate an output signal when there is a failure. The switch circuit uses the output signal from the logical product computing circuit as its source input and is switched with the carrier signal to generate an output signal for the aforementioned transmission.

The signal transmitting apparatus structured as described above does not transmit erroneous output signals even when there is a multiple failure, such as a shorting failure between the output terminals of the switch circuit and a failure in the power supply.

It is even more desirable to include a constant voltage circuit and a source monitoring circuit in the signal transmitting apparatus according to the present invention. The constant voltage circuit is provided with a series regulator, which is supplied with a voltage created by rectifying and smoothing an AC source, which generates a stabilized DC output voltage. The source monitoring circuit includes a level detecting circuit and an ON delay circuit. The level detecting circuit uses the voltage being output from the series regulator as its source and also uses the voltage being input into the series regulator as its monitoring input. It does not output a signal when there is a failure. The ON delay circuit uses the signal being output from the level detecting circuit as its input signal and outputs a signal that becomes the source monitoring signal with a delay relative to the rise of the voltage being output from the level detecting circuit. It does not output a signal at the time of a failure.

The level detecting circuit and the logical product computing circuit are constituted with fail-safe window comparators.

BRIEF DESCRIPTION OF THE DRAWINGS

The following is a more detailed explanation of other advantages and features of the present invention in reference to the attached drawings.

DESCRIPTION OF THE PREFERRED EMBODIMENTS

Figure 1:
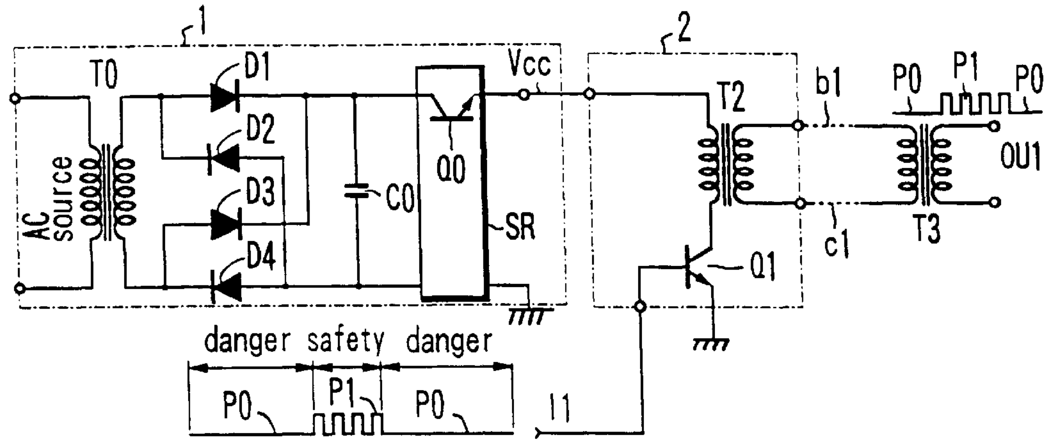
FIG. 1 PRIOR ART
FIG. 1 is a block diagram showing an example of a signal transmitting apparatus in the prior art and is provided to facilitate better understanding of the present invention.

In order to facilitate better understanding of the present invention, a signal transmitting apparatus in the prior art is explained before explaining the present invention. FIG. 1 is a circuit diagram of a signal transmitting apparatus in the prior art. The signal transmitting apparatus shown in FIG. 1 is provided with a power supply 1 and a transmitting circuit 2.

The power supply 1 is provided with a source transformer T0 and diodes D1, D2, D3 and D4 which constitute a full-wave rectifying circuit, a smoothing capacitor C0 and a constant voltage circuit SR, which is normally constituted with a series regulator. The constant voltage circuit SR has a function to generate the output of the smoothing capacitor C0 as a constant source voltage Vcc for the transmitting circuit 2. A transistor is Q0, located inside the constant voltage circuit SR performs control between the input and the output of the constant voltage circuit SR. In a power supply such as described above, there are potential situations in which the output voltage of the smoothing capacitor C0 is generated directly as the source voltage Vcc due to a shorting failure between the collector and the emitter of the transistor Q0, or a pulsating current is output as the source voltage Vcc because of a disconnection failure in the lead line of the smoothing capacitor C0.

The transmitting circuit 2 includes a transformer T2 and a transistor Q1. The secondary coil of the transformer T2 is connected with the primary coil of the transformer T3, which constitutes a receiving circuit, with lines b1 and c1. The transistor Q1 is switched by an alternating signal P1, which is included in an input signal I1 indicating safety, and is not switched by a signal P0 indicating danger. Since the collector of the transistor Q1 is connected to the primary coil of the transformer T2, when the signal P1 of the input signal I1 is being input to the transistor Q1, this alternating signal is output at the secondary coil of the transformer T2. When the signal P1 of the input signal I1 is not input, i.e., when the signal P0 is being input, no alternating signal is generated in the output of the secondary coil of the transformer T2. The signal being output from the transformer T2 is supplied to the primary coil of the transformer T3 and the alternating signals P1, P0, which correspond to the input signal I1 are regenerated as a signal OU1 at the secondary coil of the transformer T3.

Now, the characteristics of the signal transmitting apparatus shown in FIG. 1 at the time of a failure are examined. When there is a failure in the transistor Q1, i.e., when there is a shorting failure between the collector and the emitter of the transistor Q1, when there is a disconnection failure at the collector terminal, or when there is a disconnection failure at the primary coil or the secondary coil of either one of the transformers T2 and T3, the input signal I1 is not regenerated as the signal OU1 from the transformer T3. In this aspect, the apparatus shown in FIG. 1 is fail-safe. However, if after there has been a shorting failure between the collector and the emitter of the transistor Q1, there is also a disconnection failure in the smoothing capacitor C0 of the power supply that generates the source voltage Vcc and noise enters via the source transformer T0, the noise is applied to the transformer T2 via the series regulator. Such noise includes noise with great amplitude that is generated in an external invertor source, for instance. This noise will be communicated to the transformer T2 and is generated as an erroneous alternating signal output OU1. Thus, the apparatus shown in FIG. 1 has a problem in that, if there is a shorting failure in the transistor Q1 and there is also a failure in the power supply that supplies the source power to the transmitting circuit, it is directly exposed to the noise entering from the source.

Figure 2:
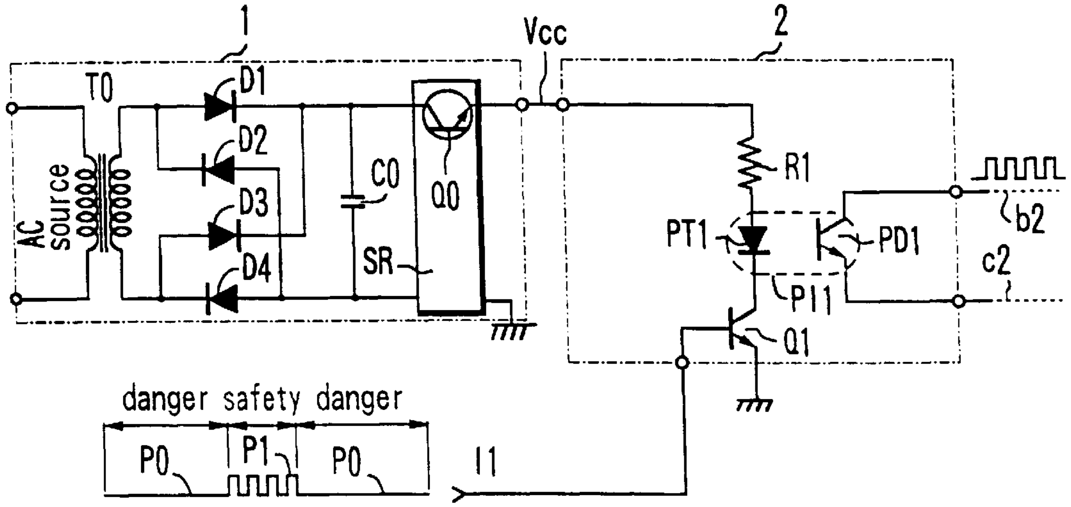
FIG. 2 PRIOR ART
FIG. 2 is a block diagram showing another example of a signal transmitting apparatus in the prior art and is provided to facilitate better understanding of the present invention.

FIG. 2 is a circuit diagram of another signal transmitting apparatus in the prior art. This apparatus is provided with an optically coupled element PI1 as a means for transmitting signals to the transfer lines b2 and c2. The input signal I1 to be transmitted is constituted with the signals P1 and P0 as in the case of the prior art apparatus shown in FIG. 1. The signal PI is applied to the base of the transistor Q1 in the same manner as in the prior art apparatus shown in FIG. 1 and with this, a light emitting element PT1 of the optically coupled element PI1 is switched. A resistor R1 is a current decreasing resistor and Vcc is the source voltage supplied from the power supply 1. The signal that is switched at the transistor Q1 is communicated to a light receiving element PD1 via the optically coupled element PI1. The source on the receiving side is applied to this light receiving element PD1 via the current decreasing resistor (not shown) and the light emitting element on the receiving side. When the light receiving element PD1 on the transmitting side is switched by the light emitting element PT1, the current that runs through the light emitting element on the light receiving side (not shown) is switched.

Next, the operation of the signal transmitting apparatus shown in FIG. 2 at the time of a failure is explained. The failure modes include, for instance, a shorting failure between the collector and the emitter of the transistor Q1, a disconnection failure of the collector of the transistor Q1, a disconnection failure of the resistor R1 and a disconnection failure of the light emitting element PT1 or the light receiving element PD1. When one of these failures has occurred, a switch signal is not generated from the light receiving element PD1. Also, when there is a shorting failure in the light emitting element PT1, the light emitting element PT1 does not emit light and therefore, the light receiving element PD1 is not switched. When there is a shorting failure in the light receiving element PD1, too, the light receiving element PD1 does not undergo the switching operation. Thus, the signal transmitting apparatus shown in FIG. 2 is fail-safe in this aspect.

However, if a disconnection failure occurs in the smoothing capacitor C0 of the power supply 1 in a state in which a shorting failure has occurred between the collector and the emitter of the transistor Q1, noise entering from the source transformer T0 is applied to the light emitting element PT1. Thus, with the signal transmitting apparatus in FIG. 2, there is the danger of an erroneous output signal being generated when failures have occurred in the apparatus itself as well as in the power supply 1.

Reflecting the problems of the prior art described above, the present invention, by monitoring for failures in the power supply, ensures that the transmission-side output signal may be generated only when the power supply is operating normally.

Figure 3:
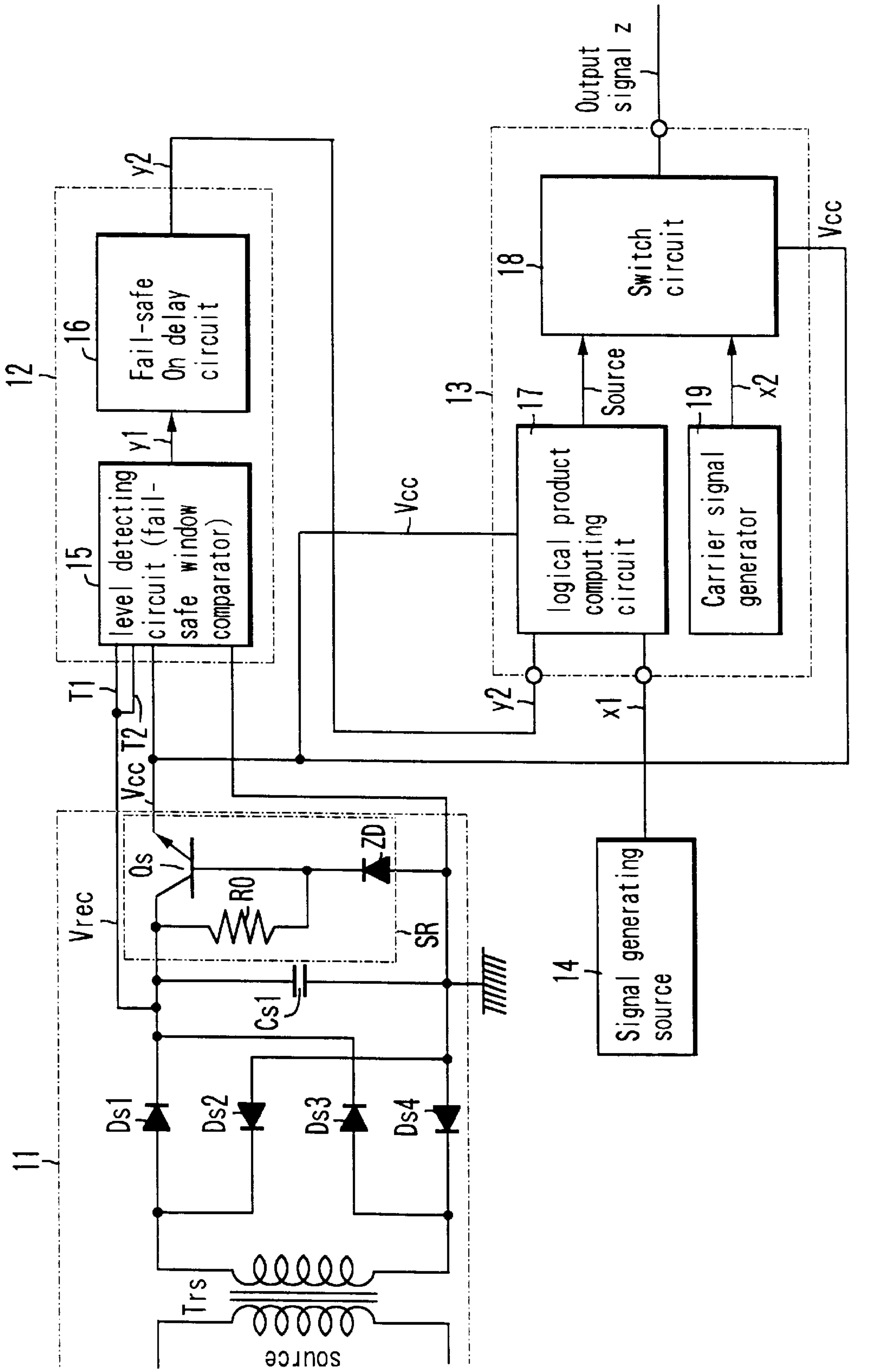
FIG. 3 is a block diagram of the signal transmitting apparatus according to the present invention.

FIG. 3 is a block diagram showing the structure of the signal transmitting apparatus according to the present invention. The signal transmitting apparatus in the figure includes a power supply 11, a source monitoring circuit 12 and a transmitting circuit 13. Reference number 14 indicates a signal generating source that generates signals to be transmitted.

The AC source (commercial source) which is stepped down by a source transformer Trs included in the power supply 11 is then rectified in a full-wave rectifying circuit constituted of the diodes Ds1 to Ds4 and then smoothed in a smoothing capacitor Cs1. The rectified voltage Vrec, which has been smoothed, is converted into a constant source voltage Vcc for the transmitting signal at a constant voltage circuit SR. FIG. 3 shows the simplest example of the constant voltage circuit SR, in which an electrical current is supplied to a constant voltage diode ZD via a current decreasing resistor R0 from the collector of a transistor Qs and the voltage between the terminals of the constant voltage diode ZD is applied between the base and the emitter of the transistor Qs. Such a series regulator is the most commonly known type.

The source monitoring circuit 12 is provided with a fail-safe level detecting circuit 15 and a fail-safe ON delay circuit 16. The fail-safe level detecting circuit 15 uses the source voltage Vcc being output from the constant voltage circuit SR as a source potential to perform level detecting of the DC voltage Vrec being input into the constant voltage circuit SR. In the present invention, the fail-safe level detecting circuit 15 is constituted with a fail-safe window comparator. Such a window comparator is already known, disclosed in U.S. Pat. No. 4,661,880 and U.S. Pat. No. 5,027,114.

Figure 4:
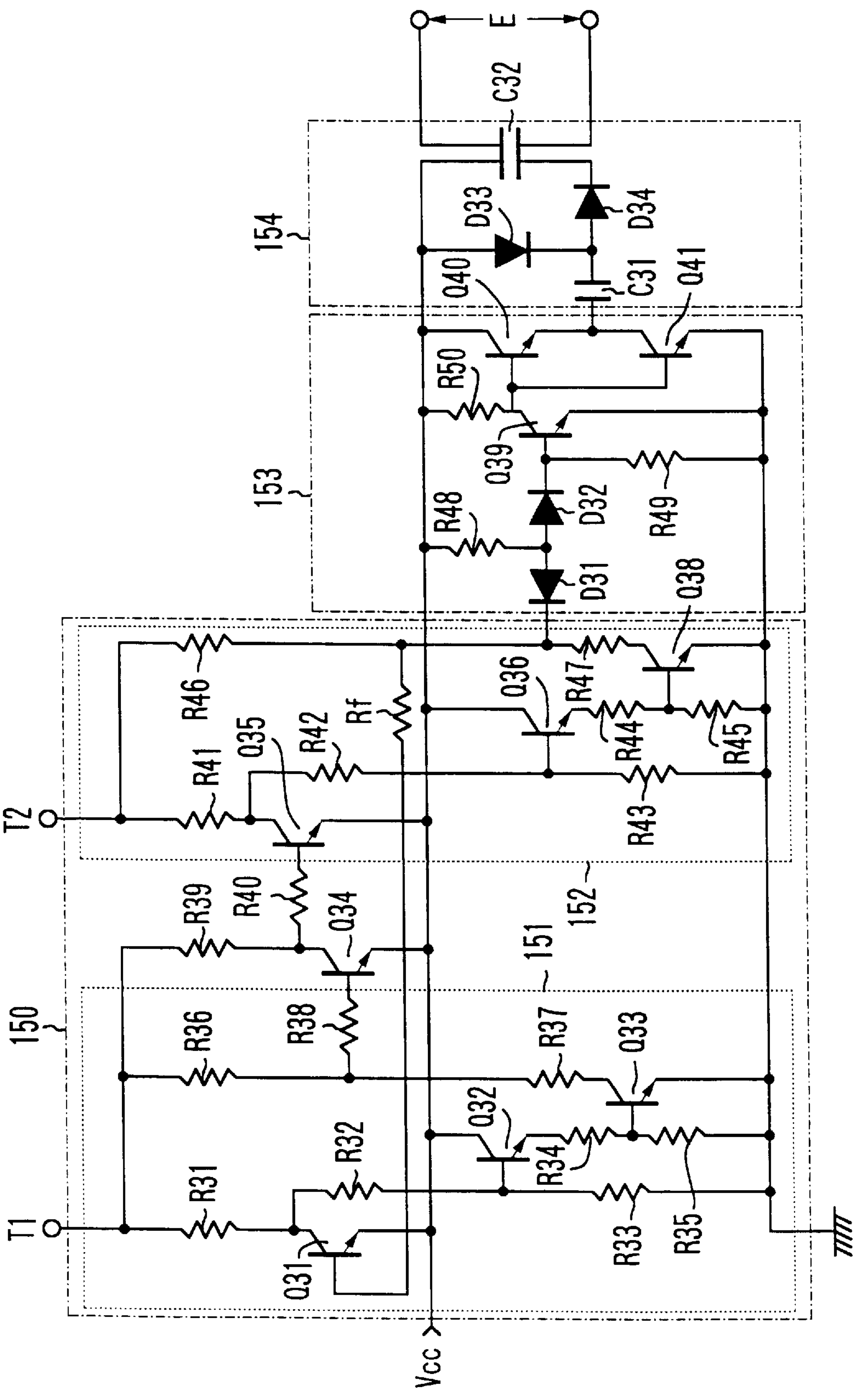
FIG. 4 is a specific circuit diagram of the fail-safe window comparator used in the signal transmitting apparatus shown in FIG. 3.

FIG. 4 shows an example of a window comparator described above. The window comparator in the figure is provided with a feedback oscillating circuit 150. The feedback oscillating circuit 150, in turn, includes a DC amplifying circuit 151 and a DC amplifying circuit 152. The DC amplifying circuit 151 comprises transistors Q31, Q32 and Q33 and the DC amplifying circuit 152 comprises transistors Q35, Q36 and Q38. A transistor Q34 and a resistor R39, which constitute an invertor, are connected between the DC amplifying circuit 151 and the DC amplifying circuit 152. The DC amplifying circuit 151 and the DC amplifying circuit 152 are linked via the invertor which is constituted with the transistor Q34 and the resistor R39, resistors R38 and R40 and a feedback resistor Rf to constitute a feedback oscillating circuit 150. With the source voltage at Vcc and the input voltages at the input terminals T1 and T2 referred to as V1 and V2 respectively, this feedback oscillating circuit 150 oscillates when the input voltages V1 and V2 at the input terminals T1 and T2 satisfy the following conditions:

$$(R31+R32+R33)Vcc/R33<V1<(R36+R37)Vcc/R37 \quad (1),$$

$$(R41+R42+R43)Vcc/R43<V2<(R46+R47)Vcc/R47 \quad (2).$$

The feedback oscillating circuit 150 described above oscillates only when the input voltage V1 at the input terminal T1 and the input voltage V2 at the input terminal T2 satisfy the conditions (1) and (2) above respectively.

In addition, since oscillation cannot be performed if there is a failure in any one of the transistors Q31 to Q41 that constitute the feedback oscillating circuit 150, or if there is a disconnection failure in a resistor, it fulfills a function as a fail-safe AND gate.

In addition, in the following conditions which are obtained based upon conditions (1) and (2), $$(R31+R32+R33)Vcc/R33\approx V1 \quad (3),$$

$$(R41+R42+R43)Vcc/R43\approx V2 \quad (4);$$

the input voltage V1 in condition (3) indicates the lower limit threshold value that should be applied to the input terminal T1 in order for the feedback oscillating circuit 150 to oscillate. Hereafter, the lower limit threshold value of the input voltage V1 that must be applied to the input terminal T1 will be indicated as TL1. Likewise, the input voltage V2 in condition (4) represents the lower limit threshold value that must be applied to the input terminal T2 in order for the feedback oscillating circuit 150 to oscillate. Hereafter, the lower limit threshold value that must be applied to the input terminal T2 will be indicated as TL2.

Next, in the following conditions which are obtained based upon conditions (1) and (2), $$(R36+R37)Vcc/R37\approx V1 \quad (5),$$

$$(R46+R47)Vcc/R47\approx V2 \quad (6);$$

the input voltage V1 in condition (5) indicates the upper limit threshold value that must be applied to the input terminal T1 in order for the feedback oscillating circuit 150 to oscillate. Hereafter, the upper limit threshold value of the input voltage V1 that must be applied to the input terminal T1 will be indicated as TH1. Likewise, the input voltage V2 in condition (6) represents the upper limit threshold value that must be applied to the input terminal T2 in order for the feedback oscillating circuit 150 to oscillate. Hereafter, the upper limit threshold value that must be applied to the input terminal T2 will be indicated as TH2. Note that the threshold values TL1, TL2, TH1, TH2 described above are potentials that are higher than the source potential Vcc ( TL1, TL2, TH1 and TH2>Vcc).

The window comparator shown in FIG. 4 further includes an amplifying circuit 153 and a voltage doubler rectifying circuit 154. The amplifying circuit 152 amplifies the signal being output from the transistor Q38 which is included in the feedback oscillating circuit 150. The amplifying circuit 153 in the figure includes diodes D31 and D32, resistors R48, R49 and R50 and transistors Q39, Q40 and Q41 and performs ON/OFF operation with the oscillation of the transistors Q39, Q40 and Q41. The voltage doubler rectifying circuit 154 includes capacitors C31 and C32 and diodes D33 and D34.

When the feedback oscillating circuit 150 oscillates, the transistor Q38 is switched. During this switching operation, when the transistor Q38 enters the ON state, the transistor Q39 shifts to the OFF state and, with this, the input potential of the voltage doubler rectifying circuit 154 becomes approximately equal to the source potential. When the transistor Q38 enters the OFF state, the transistor Q39 shifts to the ON state and, with this, the input potential of the voltage doubler rectifying circuit 154 becomes a ground potential (0 level). The capacitor C31 and the diode D33 cause the change in the input potential of the voltage doubler rectifying circuit 154 to be clamped by the source potential Vcc and rectified and smoothed by the diode D34 and the capacitor C32. The capacitor C32 is shown as a 4-terminal capacitor. This 4-terminal capacitor is a capacitor of the prior art that is often used because of its structure, which does not allow the generation of output signals when a disconnection failure occurs in a lead line. If a regular capacitor other than a 4-terminal capacitor is used for the capacitor C32, the signal being output from the diode D34 (in other words, the switch signal of the amplifier 153) is clamped by the source potential Vcc and is output when a disconnection failure has occurred in a lead line of the capacitor. However, even when this happens, the AC signal output from the diode D34 is not erroneously generated unless the two input signals of the feedback oscillating circuit 150 satisfy the requirements expressed in conditions (1) and (2). In particular, if the output signal from the window comparator is input to the fail-safe ON delay circuit 16, to be explained later, as shown in FIG. 3, the capacitor does not necessarily have to be a 4-terminal capacitor.

Referring back to FIG. 3, the level detecting circuit 15, which is constituted with a fail-safe window comparator, performs level detecting for the rectified voltage Vrec to the constant voltage circuit SR which is included in the power supply 11. The level detecting circuit 15 generates a level detecting output signal y1 if the rectified voltage Vrec is higher than a specific level (assuming that the upper limit threshold values TH1 and TH2 are high enough). In an embodiment in which the level detecting circuit 15 is constituted with a fail-safe window comparator, if the rectified voltage Vrec is higher than the lower limit threshold values TL1 and TL2 of the fail-safe window comparator, the fail-safe window comparator oscillates and then a rectified output voltage (E) is generated from the voltage doubler rectifying circuit 154 (see FIG. 4). In the case of the embodiment shown in FIG. 3, the lower limit threshold value TL1 at the input terminal T1 and the lower limit threshold value TL2 at the input terminal T2 are equal to each other and the input terminal T1 and the input terminal T2 (see FIG. 4) of the fail-safe window comparator are connected commonly, to function as a single input terminal.

The fail-safe ON delay circuit 16 is a delay circuit in which a source monitoring signal y2 rises with a specific delay period after the rise of the level detecting signal y1 output from the level detecting circuit 15, which is constituted with a fail-safe window comparator. Fail-safe ON delay circuits are disclosed in Japanese Examined Patent Publication No. 23006/1989 and U.S. Pat. No. 5,027,114. The fail-safe ON delay circuit disclosed in Japanese Examined Patent Publication No. 23006/1989 employs a UJT (unijunction transistor) oscillating circuit while U.S. Pat. No. 5,027,114 discloses an ON delay circuit that employs a CR circuit.

Figure 5:
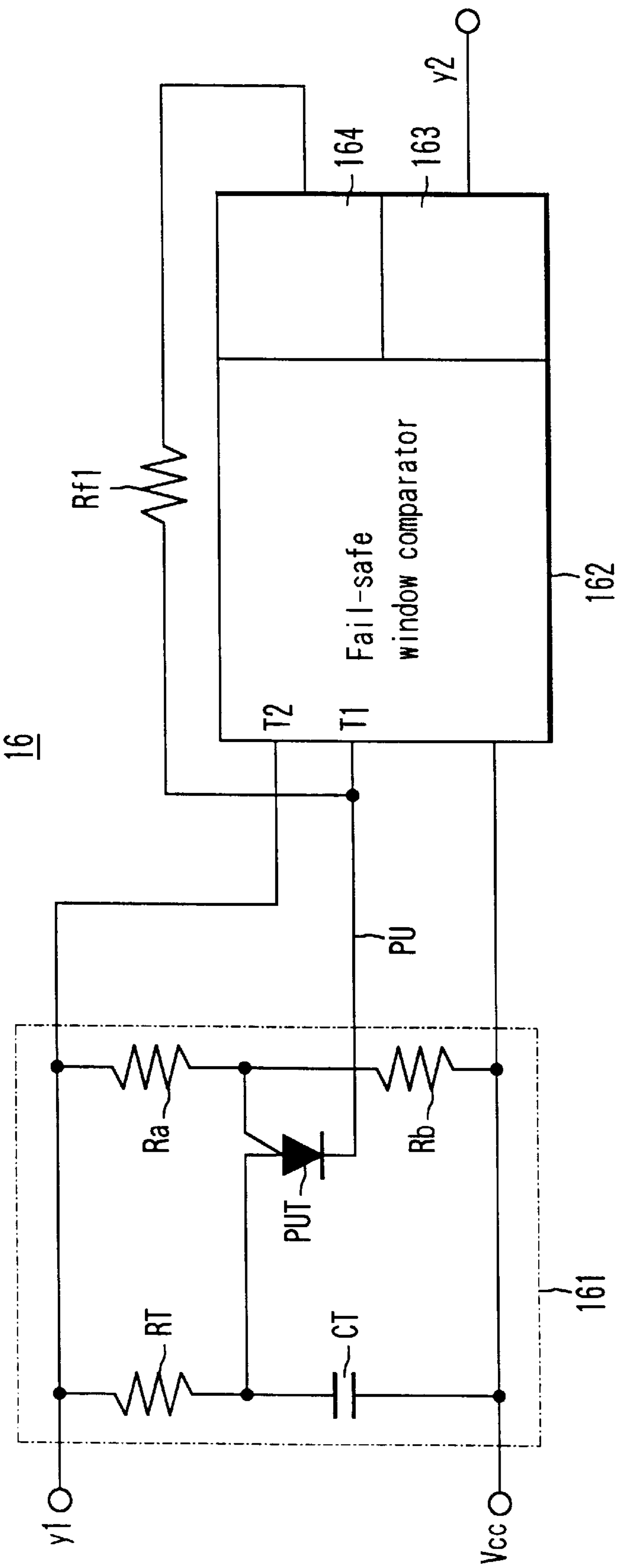
FIG. 5 is a block diagram showing the structure of the fail-safe ON delay circuit employed in the signal transmitting apparatus shown in FIG. 3.

FIG. 5 shows an example of a fail-safe ON delay circuit that employs a PUT (programmable unijunction transistor) oscillating circuit. This fail-safe ON delay circuit is, in principle, identical to the one disclosed in Japanese Examined Patent Publication No. 23006/1989 described above. The fail-safe ON delay circuit shown in FIG. 5 is provided with a PUT oscillating circuit 161, a fail-safe window comparator 162 and rectifying circuits 163 and 164.

The PUT oscillating circuit 161 is an oscillating circuit in the known art in which, when a signal (E) whose potential is higher than the source potential Vcc is input as a signal y1, a pulse PU is output after a specific length of time, which is determined by the ratio of divided voltages of the resistors Ra and Rb, and the time constant of the resistor RT and the capacitor CT has elapsed.

The window comparator 162 is identical to the one shown in FIG. 3. Since the signal y1 is also input to the input terminal T2 of the window comparator, when a signal y1, which is higher than the lower limit threshold value TL2 at the input terminal T2, is input, the output pulse PU, which corresponds to the delay time in the PUT oscillating circuit 161, is input to the input terminal T1 of the window comparator from the PUT oscillating circuit 161. This output pulse PU is at a higher level than the lower limit threshold value TL1 at the input terminal T1 of the window comparator 162. Thus, the window comparator 162 oscillates. Since the signal being output from the rectifying circuit 164 that results from this oscillation is fed back to the input terminal T1 via a resistor Rf1, a self-holding operation is performed, whereby the input voltage is continuously applied to the input terminal T1 even when the output pulse PU of the PUT oscillating circuit 161 becomes extinct. Then, only when the signal y1 becomes lower than the lower limit threshold value at the input terminal T2, does the source monitoring signal y2 become extinct. The PUT oscillating circuit 161 shown in FIG. 5 has a characteristic such that, if there is a disconnection failure in any of the resistors Ra, Rb and RT, which constitute the circuit, a disconnection or shorting failure occurs in the capacitor CT or a failure occurs in the PUT, oscillation cannot be performed (the output pulse PU is not generated). Note that the upper limit threshold values (TH1, TH2) of the window comparator employed to constitute the ON delay circuit 16 in FIG. 5 are set at sufficiently high levels and the threshold values of the window comparator are set in such a manner that, if a voltage higher than the lower limit threshold value (TL1, TL2) is input, oscillation is performed.

The rectifying circuits 163 and 164 are structured almost identically to the rectifying circuit 154 shown in FIG. 3. The signal being output from the rectifying circuit 164 is fed back to the input terminal T1 via the feedback resistor Rf1 to constitute a self-holding circuit. A holding circuit that employs a window comparator in this manner is also disclosed in U.S. Pat. No. 5,027,114.

Referring back to FIG. 3. again, the signal transmitting circuit 13 uses the transmission signal x1 and the source monitoring signal y2 as input signals and transmits a signal that corresponds to the transmission signal x1. The signal transmitting circuit 13 transmits the logical product signal of the signal indicating that the transmission signal x1 and the source monitoring signal y2 are normal and a carrier signal x2 for carrying the transmission signal. At the time of a failure, the output signal is not generated. To be more specific, the signal transmitting circuit 13 includes a logical product computing circuit 17 and a switch circuit 18. The logical product computing circuit 17 performs the logical product calculation to calculate the logical product of the source monitoring signal y2 and the transmission signal x1. The logical product computing circuit 17 is structured as a circuit that does not output a signal at the time of a failure. Such a logical product computing circuit 17 may be achieved with the fail-safe window comparator shown in FIG. 4.

The switch circuit 18 uses the signal being output from the logical product computing circuit 17 as a source, is switched by the carrier signal x2 and generates an output signal for transmission.

Figure 6:
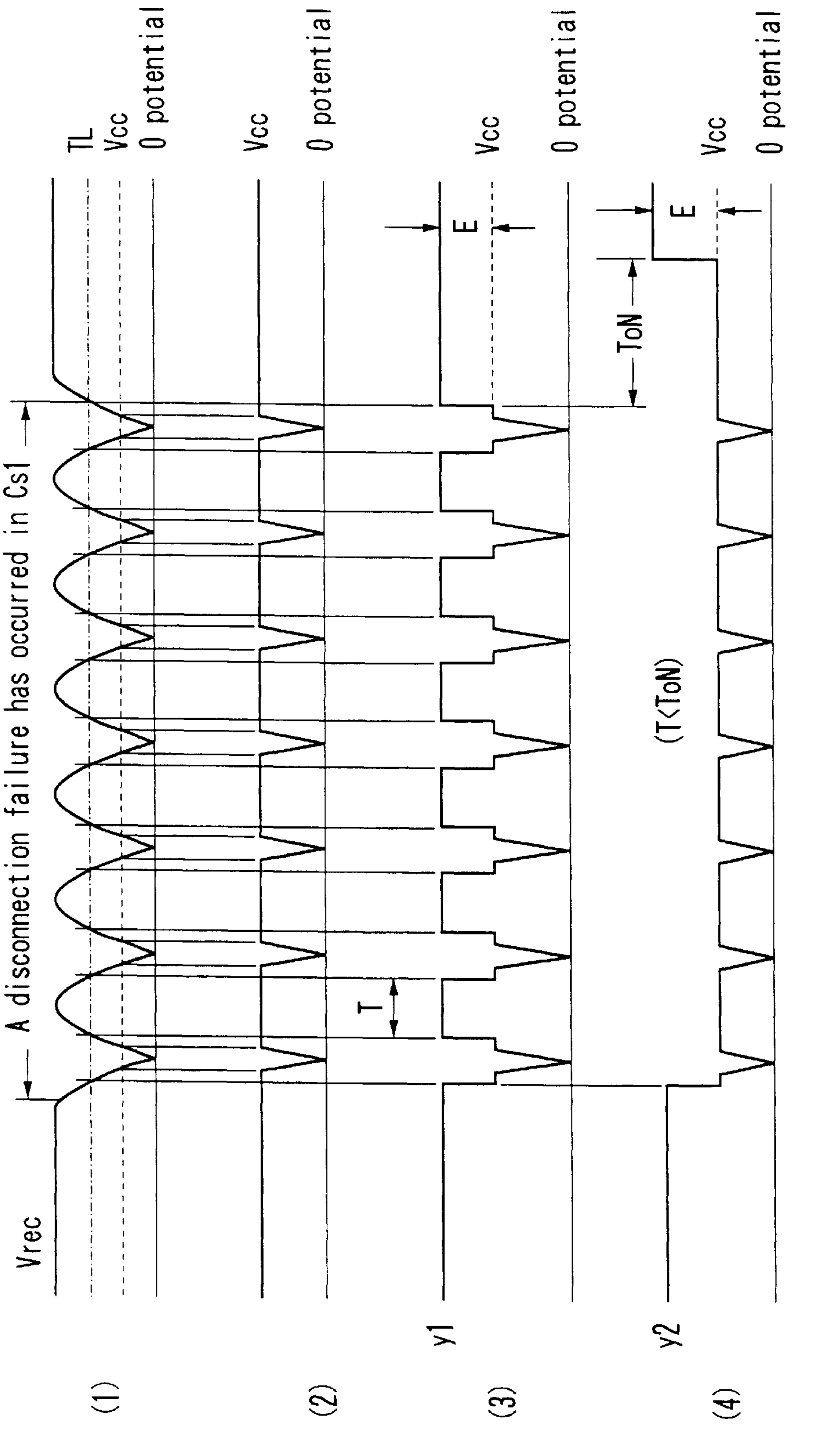
FIG. 6 is a time chart provided to illustrate the operation of the signal transmitting apparatus shown in FIG. 7.

Next, in reference to the time chart in FIG. 6, the circuit operation of the signal transmitting apparatus shown in FIG. 3 is explained.

The lower limit threshold value TL (TL1=TL2) of the fail-safe window comparator that constitutes the level detecting circuit 15 is set between the rectified voltage Vrec being output from the full-wave rectifying circuit, which is constituted with the diodes Ds1 to Ds4 under normal conditions, and the voltage Vcc being output from the series regulator. As a result, when the voltage Vrec being output from the full-wave rectifying circuit is normal, and the constant voltage circuit SR is operating normally, the fail-safe window comparator, which constitutes the level detecting circuit 15, oscillates, which, in turn, generates a rectified output voltage (E) as the output signal y1. (see FIG. 4) The fail-safe ON delay circuit 16, too, generates a voltage which is equal to the rectified output voltage (E), as the source monitoring signal y2 (see FIG. 4).

Now, consider a hypothetical situation in which a disconnection failure has occurred in a lead line of the smoothing capacitor Cs1, which constitutes the power supply 11, and this disconnection failure has been restored to normal. Such a failure seldom occurs in reality, but this hypothesis is considered here in order to facilitate the explanation of the operation of the signal transmitting apparatus in FIG. 3. FIG. 6, time chart (1) shows the waveform being output from the full-wave rectifying circuit in this situation. Next, referring to time chart (1), the period in which a pulsating current, due to the disconnection of the lead line of the smoothing capacitor Cs1, is generated will be considered. Time chart (2) shows the waveform of the voltage being output from the constant voltage circuit SR and, when the voltage Vrec being input into the constant voltage circuit SR is smaller than the source voltage potential Vcc, the voltage being output from the constant voltage circuit SR conforms to the waveform being output from the full-wave rectifying circuit. The lower limit threshold value TL (TL1=TL2) of the fail-safe window comparator, which constitutes the level detecting circuit 15, is set higher than the voltage Vcc being output from the constant voltage circuit SR. Because of this, when the voltage being input into the constant voltage circuit SR starts to decrease, the voltage being output from the constant voltage circuit SR still maintains the potential of the constant voltage Vcc, but when the voltage Vrec becomes lower than the threshold value TL, the fail-safe window comparator, which constitutes the level detecting circuit 15, will have already stopped oscillating, thus the signal y1 (the rectified output voltage (E) becoming extinct. Since the signal y1 is clamped by the source potential Vcc (see FIG. 4), when the voltage being output from the constant voltage circuit SR becomes reduced, the signal y1 also becomes reduced in conformance. This operation is shown in time chart (3).

When the fail-safe window comparator that constitutes the level detecting circuit 15 stops oscillating, thus setting the signal y1 to low, the source monitoring signal y2 of the fail-safe ON delay circuit 16 is also set to low. Moreover, since the fail-safe window comparator constituting the level detecting circuit 15 is set to high only during the period of time in which the waveform being output from the full-wave rectifying circuit exceeds the threshold value TL, if the rise delay time (ToN) of the fail-safe ON delay circuit 16 is longer than this time period T, the source monitoring signal y2 generated from the fail-safe ON delay circuit 16 does not generate the output voltage (E), the level of which is higher than the source potential Vcc while there is a disconnection failure in the lead line of the capacitor Cs1. Thus, the source monitoring signal y2 becomes a signal at the level (E), which is higher than the source potential Vcc, only when the delay time ToN of the fail-safe ON delay circuit 16 has elapsed after recovery from the disconnection failure in the lead line of the capacitor Cs1, as shown in time chart (4).

Now, in the circuit shown in FIG. 3, when a disconnection failure occurs in at least one of the diodes Ds1 to Ds4 constituting the full-wave rectifying circuit and the voltage Vrec being input into the constant voltage circuit SR becomes equal to or less than the threshold value TL by an increase which is equivalent to a ripple, for instance, the source monitoring signal y2 of the fail-safe ON delay circuit 16 does not generate an output voltage whose level is higher than that of the source potential Vcc. Also, when there is a shorting failure between the input and the output of the constant voltage circuit SR (shorting between the collector and the emitter of the transistor Qs in FIG. 3), too, a voltage that is equal to the source voltage is input to both the input terminals T1 and T2 of the fail-safe window comparator constituting the level detecting circuit 15 and, as a result, the fail-safe window comparator cannot perform oscillation. Consequently, the source monitoring signal y2 does not become an output voltage whose level is higher than the source potential. In this case, the source potential becomes the voltage Vrec being input into the constant voltage circuit SR.

When there is no circuit failure in the signal transmitting circuit 13 and a signal which indicates that the transmission signal x1 and the source monitoring signal y2 are normal is input to the logical product computing circuit 17, the logical product of this signal and the carrier signal x2 for carrying the transmission signal x1 is taken into the switch circuit 18 and the transmission signal x1 is carried by the carrier signal x2.

In the event that, while there is no failure in the signal transmitting circuit 13, a circuit failure such as described earlier has occurred in the power supply 11, no signal indicating that the source monitoring signal y2 is normal is generated. Consequently, the logical product for carrying the transmission signal x1 is not established and, thus, an output signal z is not generated. Moreover, the output signal z is not generated in the signal transmitting circuit 13 at the time of a failure. In summary, the signal transmitting circuit 13 according to the present invention can generate the output signal z only when the power supply 11 is operating normally.

In addition, even when a multiple failure occurs, such as a shorting failure between the output terminals of the switch circuit 18 together with a failure in the power supply 11, an output signal z is not erroneously transmitted.

Figure 7:
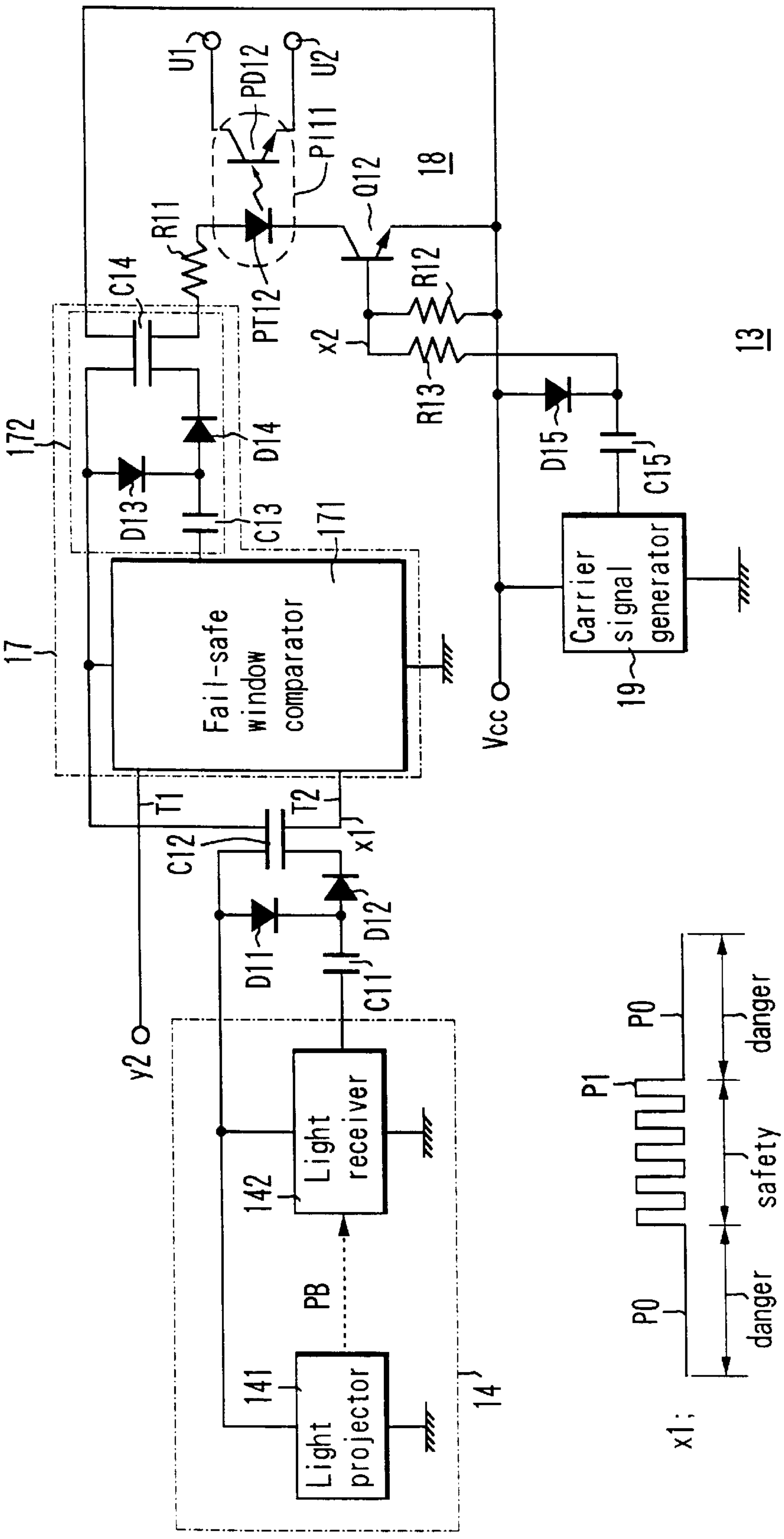
FIG. 7 is a block diagram of a further specific example of the signal transmitting apparatus according to the present invention.

FIG. 7 shows a more specific embodiment of the fail-safe signal transmitting apparatus according to the present invention. In FIG. 7, the logical product computing circuit 17 includes a fail-safe window comparator 171 and a rectifying circuit 172. The fail-safe window comparator 171 and the rectifying circuit 172 that constitute the logical product computing circuit 17 may be the same as those shown in FIG. 4. The source monitoring signal y2 of the failure monitoring circuit of the power supply in the transmitting circuit is input to the input terminal T1 of the fail-safe window comparator 171 and the signal x1 to be transmitted is input to the input terminal T2. The input signal y2 at the input terminal T1 is a failure monitoring output signal in the power supply 11 of the transmitting circuit and corresponds to the source monitoring signal y2 being output from the fail-safe ON delay circuit 16, in FIG. 3. The input signal x1 at the input terminal T2 is a signal that contains the signal (information) to be transmitted and a signal that is being output from a signal generating source 14 constituted with an optical sensor in the example shown in FIG. 7.

The signal generating source 14 includes an optical sensor, for instance, as a fail-safe sensor. Such a sensor is disclosed in U.S. Pat. No. 5,345,138. The signal generating source 14 is constituted with a light projector 141 and a light receiver 142. An AC light that is output from the light projector 141 as an optical beam PB undergoes optical/electrical signal conversion and is amplified by the light receiving element. It is then rectified in the voltage doubler rectifying circuit, which is constituted with the capacitors C11, C12 and the diodes D11, D12 and this then becomes a DC signal.

Since the voltage doubler rectifying circuit is constituted in such a manner that the input signal is clamped by the source potential Vcc, when the AC output signal of the light receiver 142 is generated, an output voltage whose potential is higher than the source potential Vcc is supplied to the input terminal T2 of the window comparator. The signal generating source 14 indicates danger when the optical beam PB is blocked and indicates safety when it is not blocked, while monitoring the danger area. As a result, it indicates safety when an AC output signal is generated at the light receiver 142 and a DC signal of the voltage doubler rectifying circuit constituted with the capacitors C11 and C12 and the diodes D11 and D12 is applied to the input terminal T2, and it indicates danger when a DC signal whose level is higher than that of the source potential Vcc is not applied to the input terminal T2 in a state in which an AC output signal is not being generated in the light receiver 142.

The switch circuit 18 includes a transistor Q12 whose base is driven by a carrier signal generator 19 and an optically coupled element PI11, which is connected to the collector of the transistor Q12. The collector of the transistor Q12 in the switch circuit 18 is led to the output terminal of the logical product computing circuit 17 via the optically coupled element PI11; a current decreasing resistor R11 and the voltage doubler rectifying circuit 172, so that the switch circuit 18 operates using the output from the logical product computing circuit 17 as its power source.

The logical product computing circuit 17, which includes a window comparator, performs level detecting to determine whether or not the upper limit threshold values TH1 and TH2 are sufficiently high and also whether or not voltages whose levels are higher than the source potential Vcc are being input to the input terminals T1 and T2 for the lower limit threshold values TL1 and TL2 respectively. When voltages that are higher than the threshold values TL1 and TL2 are input to the input terminals T1 and T2 respectively, the logical product computing circuit 17 supplies an output signal for oscillation to the rectifying circuit 172 (the logical product computing circuit 17 operates as an AND gate). The significance of the window comparator 171 operating as an AND gate is that, provided that the power supply 11 is operating normally, the output signal x1 from the optical sensor is sent to the rectifying circuit 172 via the window comparator 171 to generate an output from the rectifying circuit 172.

The transistor Q12 is switched by the signal being output from the carrier signal generator 19, using the rectified voltage of the rectifying circuit 172 for the power source. The collector of the transistor Q12 is connected to the capacitor Q14 via the current decreasing resistor R11 and a light emitting element PT12 of the optically coupled element PI11 so that the voltage being output from the voltage doubler rectifying circuit 172 is used as a source voltage. The emitter of the transistor Q12 is connected to the source potential Vcc in the transmitting circuit. Thus, the base of the transistor Q12 must have a higher input level than the source potential Vcc. The signal x2 being output from the carrier signal generator 19 is clamped by the source potential Vcc with the capacitor C15 and the diode D15, and it becomes a base input signal at the transistor Q12 via a current decreasing resistor R13. The resistor R12 is a leak resistor of the transistor Q12. The electrical current, which is switched by the transistor Q12, turns ON/OFF the light emission of the light emitting element PT12 in the optically coupled element PI11 and also turns ON/OFF a light receiving element PD12.

In the structure shown in FIG. 7, the current that runs through the light emitting element PT12 in the optically coupled element PI11 is supplied from the voltage doubler rectifying circuit 172 and unless a rectified output voltage (E) that is higher than the source potential Vcc is generated in the voltage doubler rectifying circuit 172, the light emitting element PT12 does not emit light. In other words, the light emitting element PT12 sends an optical switch signal to the light receiving element PD12 when both the signal being output from the voltage doubler rectifying circuit 172 and the signal being output from the carrier signal generator 19 are input to the transistor Q12, and the signal being output from the light emitting element PT12 is generated by the logical product of the signal being output from the voltage doubler rectifying circuit 172 and the signal x2 being output from the carrier signal generator 19. Even if a shorting failure occurs between the collector and the base of the transistor Q12 and, in probability resulting in a state in which the light emitting element PT12 is directly driven by the carrier signal generator 19 via the resistor R13, the light emitting element PT12 does not generate light emission output because the resistance value in the resistor R13 is high. This means that the light emitting element PT12 generates an AC light output signal only when the transistor Q12 is operating normally and a voltage that is higher than the source potential Vcc is supplied from the voltage doubler rectifying circuit 172. It goes without saying that when there is a failure in the light emitting element PT12 or the light receiving element PD12, too, no AC signal emerges at the output terminals U1 and U2.

In reference to FIG. 7, a voltage whose level is higher than the source potential Vcc is output from the voltage doubler rectifying circuit 172 when all of the following conditions are satisfied; (a) when the signal y2, which indicates that the power supply is operating normally, is being output from the fail-safe ON delay circuit 16 performing source monitoring, (b) a signal P1, which indicates safety is received from the light receiver 142 of the optical sensor, (c) this received signal P1 is rectified in the voltage double rectifying circuit constituted with the diodes D11 and D12 and the capacitors C11 and C12, and (d) the rectified signal is input to the input terminal T2 of the fail-safe window comparator 171 constituting the logical product computing circuit 17. In the above process, the signal x1 at the input terminal T2 of the fail-safe window comparator 171 contains a signal (information) which is the purpose of transmission of the transmitting circuit shown in FIG. 7. The transmitting circuit shown in FIG. 7, which is constituted with the fail-safe window comparator 171, a current decreasing resistor R11, the light emitting element PT12 and the switch element Q12 constituted of a transistor, outputs a logical product signal from the light emitting element PT12 constituted of the logical product of the following three input signals: i.e., the monitoring signal y2 from the power supply that is input to the input terminal T1, the signal x1, which is used as the transmission signal and is input to the input terminal T2 and the carrier signal x2, which is input to the base of the transistor Q12. If any one of these three signals is not input, or if there is a failure in the circuit, the output from the light emitting element PT12 is not generated in this circuit.

Now, a case is examined in which a failure occurs in the power supply.

In the signal transmitting apparatus shown in FIG. 7, when a failure occurs in the power supply 11 shown in FIG. 3, the fail-safe ON delay circuit 16 does not output the signal y2 at a high level voltage (E) during a specific length of delay time ToN, even if the source voltage in the transmitting circuit recovers from a low level state to a specific constant voltage Vcc. Consequently, since the voltage at the input terminal T1 of the fail-safe window comparator 171 remains at low even if the constant voltage Vcc temporarily recovers to a normal voltage having the waveform shown in time chart (1) in FIG. 6, the fail-safe window comparator 171 does not oscillate. In addition, if a shorting failure occurs between the input and the output of the constant voltage circuit SR shown in FIG. 3, the constant voltage Vcc at each of the blocks constituting the transmitting circuit becomes the voltage Vrec being input into the series regulator. In other words, while the source potential Vcc in FIG. 6 increases to the level of the voltage Vrec, the input signal at the input terminal T1 of the fail-safe window comparator 171, too, requires an input voltage that is higher than this new source potential Vrec, and a voltage higher than this source voltage Vrec is required for the source voltage of the transistor Q12 (the voltage that should be generated in the rectifying circuit 172). Thus, since a level that is higher than that of the source voltage Vrec is not generated in the fail-safe ON delay circuit 16 in FIG. 3, no signal is generated in the light emitting element PT12.

While FIG. 7 shows an example in which an optically coupled element is used as a means for transmission, it is obvious that the same advantages can be achieved using a transformer instead of the optically coupled element.

Figure 8:
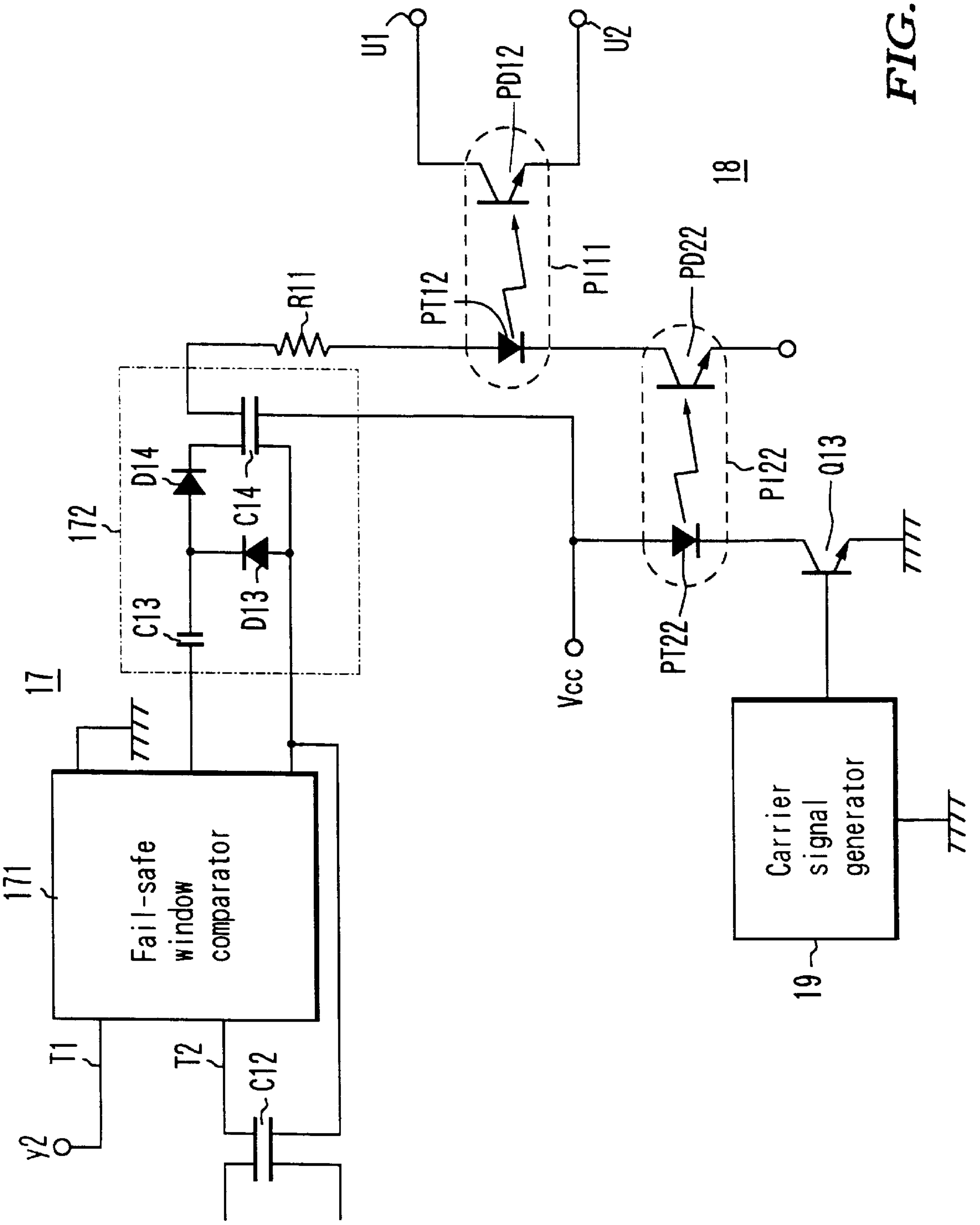
FIG. 8 is a circuit diagram of another embodiment of the signal transmitting apparatus according to the present invention.

FIG. 8 shows an example in which an optically coupled element PI22 is employed to replace the coupling of the base of the transistor Q12 and the signal x2 being output from the carrier signal generator 19 in FIG. 7. In FIG. 8, the signal x2 being output from the carrier signal generator 19 is input to a light emitting element PT22 of the optically coupled element PI22, the optical output of the light emitting element PT12 is switched by the signal x1 being output from the carrier signal generator 19 by using a transistor Q13, and the electrical current running through the light emitting element PT22 is thereby switched. With this, the light emitting element PT12 of the optically coupled element PI11 is switched and the transmission output signal is generated. With the transmitting circuit shown in FIG. 8, the concern about the error of the carrier signal x2 being directly output due to shorting between the collector and the base of the transistor Q12 shown in FIG. 7 is totally eliminated.

According to the present invention, a fail-safe signal transmitting apparatus which does not generate an erroneous transmission signal that could result in a dangerous situation, even when a multiple failure, including a failure in the source, has occurred and, as a result, is extremely effective in a communication system that is required to provide a high degree of safety.

We claim:

1. A fail-safe signal transmitting apparatus comprising:

a logical product computing circuit;

a switch circuit;

a transmission signal and a source monitoring signal as input signals;

an output signal corresponding to said transmission signal and constituted of a logical product of a signal indicating that said transmission signal and said source monitoring signal are normal and a carrier signal for carrying said transmission signal is transmitted and said output signal is not transmitted at a time when said monitoring signal and said transmission signal are not normal;

wherein said logical product computing circuit performs logical product calculation for said source monitoring signal and said transmission signal and does not generate an output signal in the event that either signal is abnormal; and said switch circuit using said output signal of said logical product computing circuit as a source input, said switch circuit being switched by said carrier signal and generating said output signal.

2. A fail-safe signal transmitting apparatus according to claim 1, wherein;

said switch circuit includes an optically coupled element.

3. A fail-safe signal transmitting apparatus according to claim 1 further comprising:

a voltage stabilizing circuit which includes a series regulator with an input voltage obtained by rectifying and smoothing an AC source supplied to said series regulator to generate a stabilized DC output voltage;

a source monitoring circuit which is provided with a level detecting circuit and an ON delay circuit;

said level detecting circuit does not generate an output signal in the event of a failure, using an output voltage of said series regulator as power source and an input voltage of said series regulator as a monitoring input; and said ON delay circuit is a circuit that uses an output signal of said level detecting circuit as an input signal to generate an output signal that becomes said source monitoring signal with a delay relative to the rise of an output voltage from said level detecting circuit, while said output signal is not generated in the event of failure.

4. A fail-safe signal transmitting apparatus according to claim 3, wherein:

said switch circuit includes an optically coupled element.

5. A fail-safe signal transmitting apparatus according to claim 3, wherein;

said level detecting circuit and said logical product computing circuit each include a fail-safe window comparator.

6. A fail-safe signal transmitting apparatus according to claim 5, wherein:

said switch circuit includes an optically coupled element.

7. A power supply provided with a voltage stabilizing circuit and a source monitoring circuit, wherein:

said voltage stabilizing circuit includes a series regulator with a DC input voltage supplied to said series regulator to generate a stabilized DC output voltage;

said source monitoring circuit is provided with a level detecting circuit and an ON delay circuit;

said level detecting circuit does not generate an output signal in the event of a failure, using an output voltage of said series regulator as a power source and an input voltage of said series regulator as a monitoring input; and said ON delay circuit is a circuit that uses an output signal of said level detecting circuit as an input signal to generate an output signal with a delay relative to the rise of an output voltage of said level detecting circuit, while said output signal is not generated in the event of a failure.

8. A power supply according to claim 7, wherein;

said level detecting circuit is constituted of a fail-safe window comparator and a carrier signal is used as a transmission signal.

* * * * *